United States Patent
Sims et al.

(10) Patent No.: US 11,384,666 B2
(45) Date of Patent: Jul. 12, 2022

(54) ADAPTIVE EXHAUST VALVE WITH PURPOSE-DESIGNED SPRING

(71) Applicant: Faurecia Emissions Control Technologies, USA, LLC, Columbus, IN (US)

(72) Inventors: Keith Sims, Columbus, IN (US); Yuntian Wang, Columbus, IN (US); Eric Schepman, Columbus, IN (US); Wenqi Wu, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 449 days.

(21) Appl. No.: 16/669,022

(22) Filed: Oct. 30, 2019

(65) Prior Publication Data

US 2021/0131324 A1     May 6, 2021

(51) Int. Cl.
| | |
|---|---|
| *F01N 1/16* | (2006.01) |
| *F16K 31/56* | (2006.01) |
| *F16K 15/02* | (2006.01) |
| *F16K 15/03* | (2006.01) |
| *F16K 17/04* | (2006.01) |
| *F02D 9/10* | (2006.01) |
| *F16K 31/528* | (2006.01) |
| *F01N 1/18* | (2006.01) |

(52) U.S. Cl.
CPC ............. *F01N 1/163* (2013.01); *F01N 1/165* (2013.01); *F01N 1/18* (2013.01); *F16K 31/5282* (2013.01); *F16K 31/566* (2013.01)

(58) Field of Classification Search
CPC . F01N 1/163; F01N 1/165; F01N 1/18; F01N 1/16; F16K 31/5282; F16K 31/566; F16K 31/56; F16K 31/563; F16K 15/025; F16K 15/02; F16K 15/03; F16K 15/033; F16K 15/063; F16K 17/04; F16K 17/0433; F02D 9/10; F02D 9/04; F02D 9/08
See application file for complete search history.

(56) References Cited

U.S. PATENT DOCUMENTS

| | | | |
|---|---|---|---|
| 8,453,672 B2 * | 6/2013 | Abram | ...................... F01N 1/08 251/303 |
| 9,816,414 B2 * | 11/2017 | Abram | ...................... F01N 1/16 |
| 2008/0237521 A1 * | 10/2008 | Abram | ................ F16K 27/0227 251/213 |

(Continued)

FOREIGN PATENT DOCUMENTS

| | | | | |
|---|---|---|---|---|
| CN | 1626801 | 6/2005 | | |
| DE | 102016203794 B4 * | 3/2019 | ............... | F02D 9/04 |

(Continued)

*Primary Examiner* — Edgardo San Martin
(74) *Attorney, Agent, or Firm* — Barnes & Thornburg LLP

(57) ABSTRACT

An internal combustion engine system includes a combustion engine configured to produce exhaust gases as a product of a combustion reaction. An exhaust discharge pipe coupled to the internal combustion engine, and an adaptive valve assembly. The adaptive valve assembly is coupled to the exhaust discharge pipe and configured to receive the exhaust gases prior to the exhaust gases reaching the atmosphere. The adaptive valve assembly includes a valve flapper arranged in the passageway and configured to pivot about a flapper pivot axis from a normally-closed position to an opened position.

15 Claims, 3 Drawing Sheets

(56) References Cited

U.S. PATENT DOCUMENTS

| | | | |
|---|---|---|---|
| 2009/0057079 A1 | 3/2009 | Vanbrabant | |
| 2013/0056083 A1* | 3/2013 | Abram | F02D 9/103 137/527 |
| 2013/0232961 A1 | 9/2013 | Abram | |
| 2013/0299004 A1* | 11/2013 | Abram | F01N 1/16 137/15.25 |
| 2017/0074135 A1 | 3/2017 | Abram | |
| 2018/0347706 A1* | 12/2018 | Ishikawa | F02D 9/103 |

FOREIGN PATENT DOCUMENTS

| | | | | |
|---|---|---|---|---|
| DE | 102018204431 A1 * | 9/2019 | | |
| DE | 102019214264 A1 * | 3/2021 | | F01N 1/085 |
| EP | 1988269 A1 * | 11/2008 | | F02D 9/04 |
| EP | 2851589 | 3/2015 | | |
| EP | 3199785 A1 * | 8/2017 | | F02D 9/04 |
| JP | 2008169797 A * | 7/2008 | | F01N 13/04 |
| WO | WO-2006003017 A1 * | 1/2006 | | F02D 9/04 |
| WO | WO-2011058070 A1 * | 5/2011 | | F02D 9/102 |

* cited by examiner

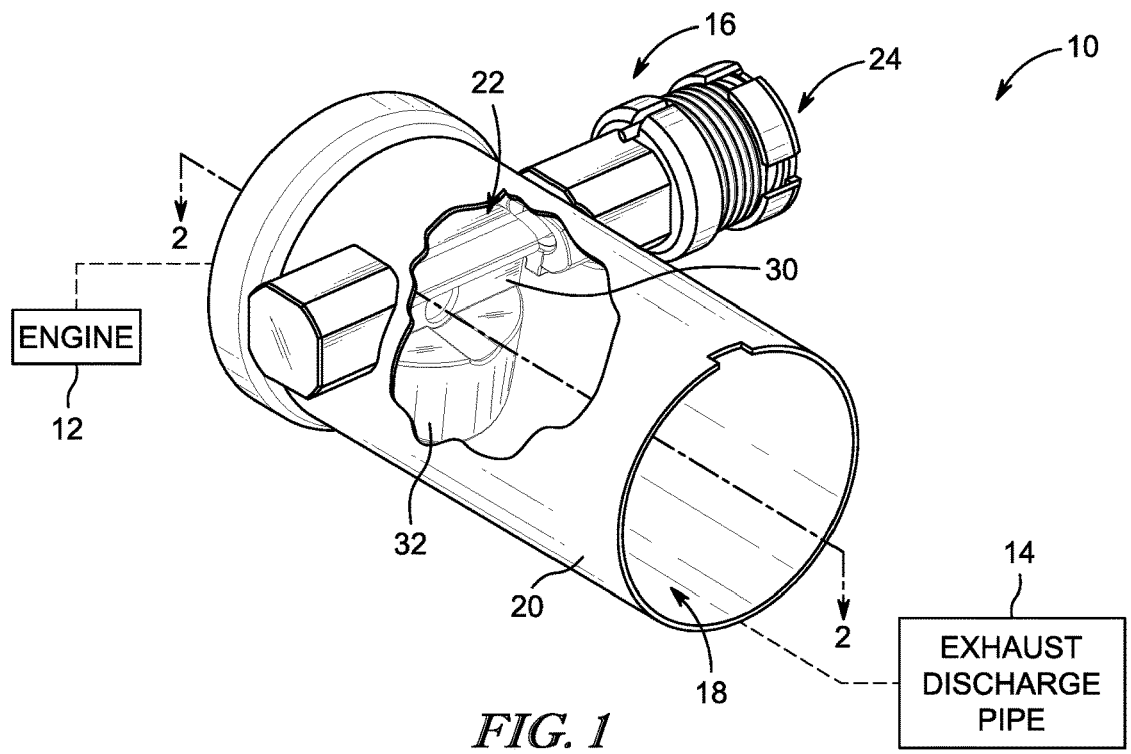
FIG. 1
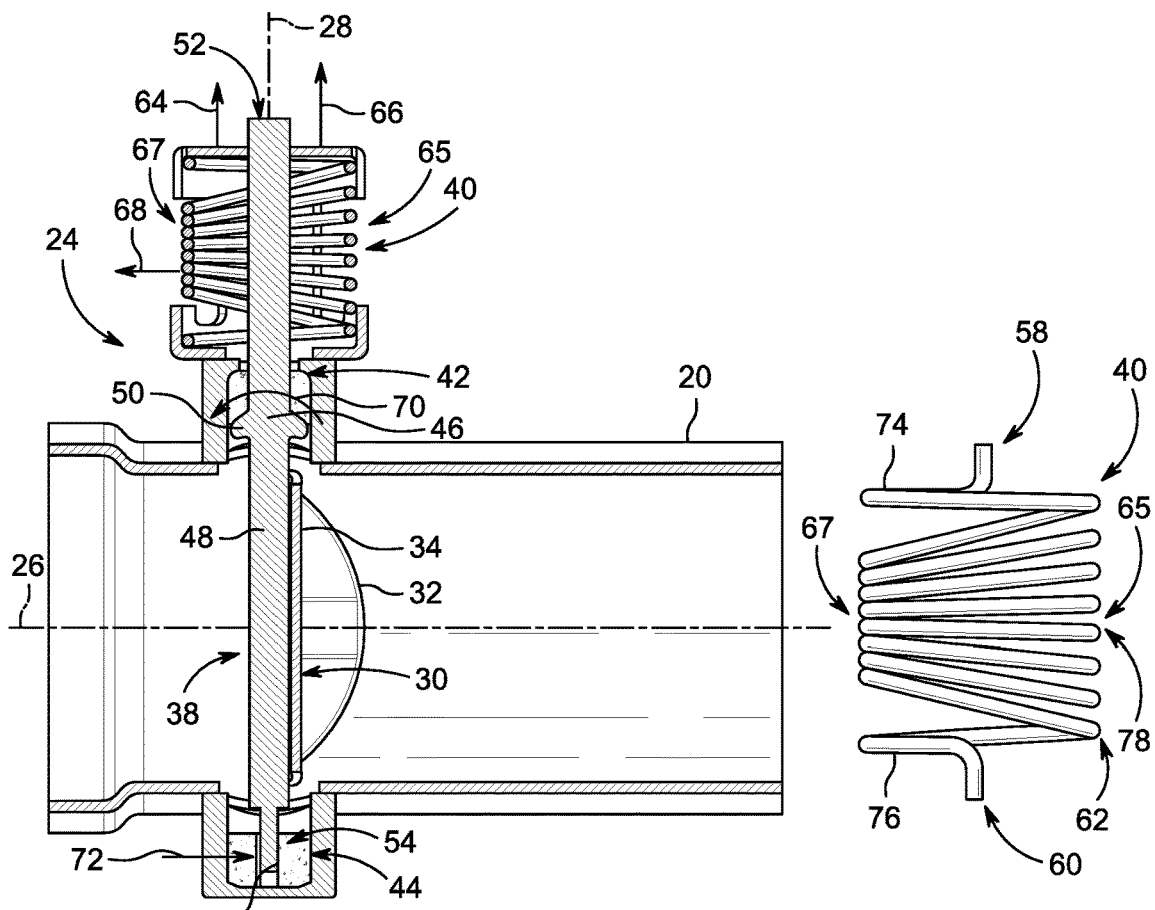
FIG. 2
FIG. 3

ADAPTIVE EXHAUST VALVE WITH PURPOSE-DESIGNED SPRING

BACKGROUND

The present disclosure relates to valves that may be used in automotive or other applications, and particularly to an adaptive valve suited for use in an automotive exhaust system.

SUMMARY

In accordance with the present disclosure, an internal combustion engine system includes a combustion engine and an exhaust system. The combustion engine is configured produce exhaust gases as a product of burning fuel. The exhaust system includes an exhaust discharge pipe that is coupled to the combustion engine and carries exhaust gases from the combustion engine to atmosphere.

In the illustrative embodiment, exhaust system further includes an adaptive valve assembly that is coupled to the exhaust discharge pipe and interacts with the exhaust gases flowing through the exhaust passageway. The adaptive valve assembly attenuates sound waves produced as a byproduct of the combustion reaction by the internal combustion engine.

In the illustrative embodiment, the adaptive valve assembly includes a pipe coupled with the exhaust discharge pipe, a valve flapper, and a flapper mount assembly that couples the valve flapper to the pipe. The valve flapper is arranged in the exhaust passageway and is movable about a flapper pivot axis from a normally-closed position to an opened position. The flapper mount assembly couples the valve flapper relative to the pipe for movement between the normally-closed position and the opened position. The valve flapper is biased toward the normally-closed position by the flapper mount assembly. The valve flapper moves toward the opened position in response to a pressure provided by the exhaust gases on the baffle plate that overcomes the biasing effect provided by the flapper mount assembly.

In the illustrative embodiment, the flapper mount assembly includes a bearing system, a valve shaft supported by the bearing system, and a resilient member that provides the biasing effect on the valve flapper. The resilient member is illustratively provided by a spring and is configured to apply a torsional force about the flapper pivot axis on the valve shaft to bias the valve flapper toward the normally-closed position.

In the illustrative embodiment, the spring also provides a spring force on the valve shaft. The spring force is asymmetrical in the axial direction such that the valve shaft is also biased laterally about a lateral axis. In this way, the valve shaft is biased by the spring into engagement with a downstream side of a barrel bushing so that shaft-to-bearing rattle is reduced.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is perspective and diagrammatic view of an internal combustion engine system including an adaptive valve assembly with a portion cut away to show a valve flapper being biased toward a closed position by a bias spring;

FIG. 2 is a cross section taken along line 2-2 in FIG. 2 showing a plurality of arrows indicating that the bias spring imparts an asymmetrical spring force on a valve shaft included in the adaptive valve assembly to bias the valve flapper toward the closed position and to bias the valve shaft laterally into engagement with a downstream side of a barrel bushing so that shaft-to-bearing chatter is reduced;

FIG. 3 is an enlarged side-elevation view of the bias spring shown in FIGS. 1 and 2 including a plurality of coils that are closed along an upstream side of the bias spring and are open along a downstream side of the bias spring to provide the asymmetrical spring force indicated by the arrows in FIG. 2;

Figure 4:
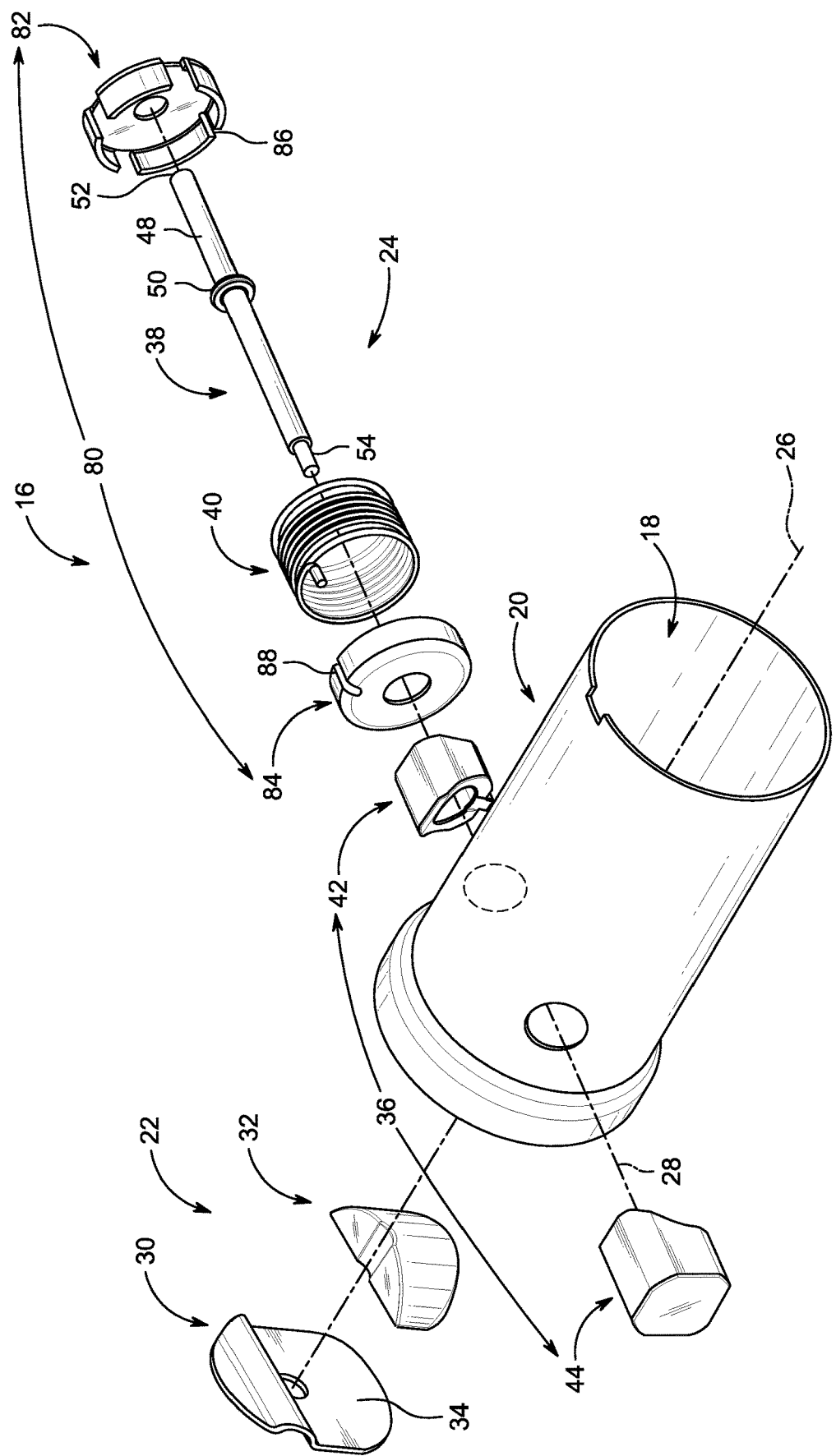
FIG. 4 is an exploded assembly view of the adaptive valve assembly of FIGS. 1 and 2.
Figure 6:
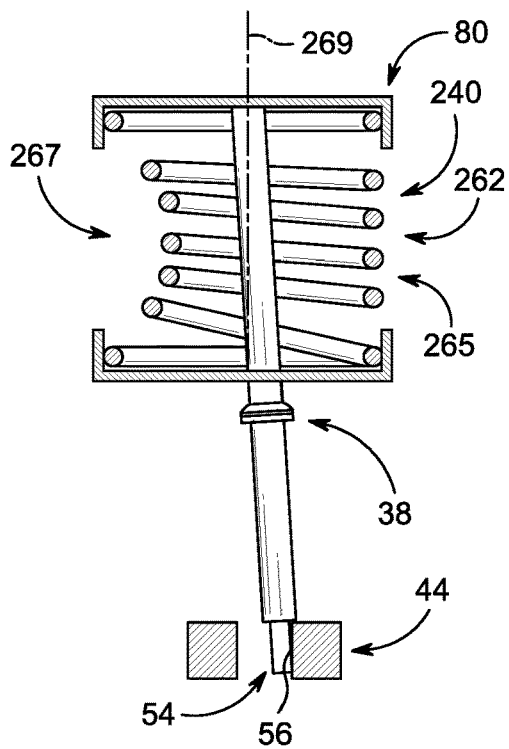
Figure 7:
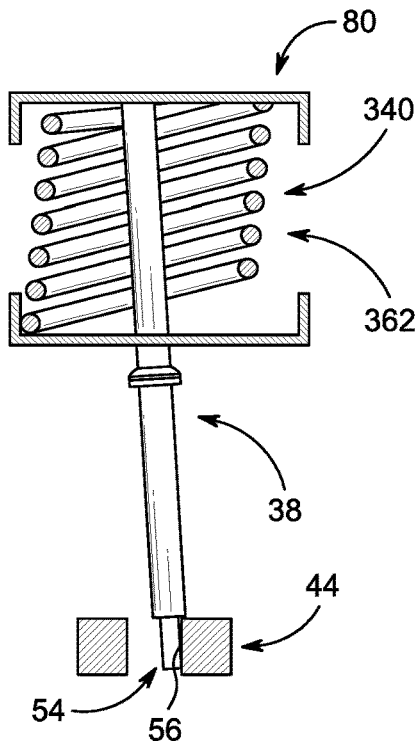

FIG. 6 is a cross section of a portion of a second embodiment of a bias spring for use in the adaptive valve assembly of FIGS. 1, 2, and 4 with the location of the valve shaft relative to the rest of the adaptive valve assembly exaggerated to show that a distal end of the valve shaft is biased into engagement with the downstream side of the barrel bushing; and FIG. 7 is a cross section of a portion of a third embodiment of a bias spring for use in the adaptive valve assembly of FIGS. 1, 2, and 4 with the location of the valve shaft relative to the rest of the adaptive valve assembly exaggerated to show that a distal end of the valve shaft is biased into engagement with the downstream side of the barrel bushing.

DETAILED DESCRIPTION

For the purposes of promoting an understanding of the principles of the disclosure, reference will now be made to a number of illustrative embodiments illustrated in the drawings and specific language will be used to describe the same.

An illustrative internal combustion engine system 10 used in a vehicle is shown in FIG. 1. The internal combustion engine system 10 includes a combustion engine 12, an exhaust discharge pipe 14, and an adaptive valve assembly 16. The combustion engine 12 configured produce exhaust gases as a product of a combustion reaction. The exhaust discharge pipe 14 is coupled to the internal combustion engine 12 and defines a passageway 18 that carries the exhaust gases from the internal combustion engine 12 to atmosphere. The adaptive valve assembly 16 is coupled along the exhaust discharge pipe 14 and interacts with the exhaust gases flowing through the exhaust passageway 18.

The adaptive valve assembly 16 is configured to attenuate sound waves produced as a byproduct of the combustion reaction in the internal combustion engine 12 prior to the exhaust gases reaching the atmosphere. The adaptive valve assembly 16 includes a pipe 20 coupled with the exhaust discharge pipe 14, a valve flapper 22, and a flapper mount assembly 24 that couples the valve flapper 22 to the pipe 20. The pipe 20 may be an integral part of the exhaust discharge pipe 14 or a separate pipe that is coupled to the exhaust discharge pipe 14 by any suitable means such as welding or brazing. The pipe 20 defines a portion of the exhaust passageway 18 and directs the exhaust gases generally along a primary exhaust-gas axis 26. The valve flapper 22 is arranged in the exhaust passageway 18 and is movable about a flapper pivot axis 28 from a normally-closed position, as shown in FIG. 1, to an opened position. The flapper mount assembly 24 locates the valve flapper 22 relative to the pipe 20 for movement between the normally-closed position and the opened position.

In the normally-closed position, the valve flapper 22 is arranged generally transverse to the primary axis 26 to obstruct the flow of exhaust gases flowing through the exhaust passageway 18 as shown in FIG. 1. The valve flapper 22 includes a baffle plate 30 and a spacer 32 coupled to a downstream side 34 of the baffle plate 30 below the flapper valve pivot axis 28. The baffle plate 30 has an outer diameter that situates the baffle plate 30 in the exhaust passageway 18 to reduce the flow of exhaust gases in the closed position. In the opened position, the baffle plate 30 of the valve flapper 22 extends generally parallel with the primary axis 26. The spacer 32 engages an inner surface of the pipe 20 to stop further rotation of the valve flapper 22 past the opened position.

In the illustrative embodiment, the adaptive valve assembly 16 is passive such that its configuration is determined by the flow of exhaust gases through the exhaust discharge pipe 14 and the pipe 20. The valve flapper 22 is biased toward the normally-closed position by the flapper mount assembly 24. The valve flapper 22 moves toward the opened position in response to a pressure provided by the exhaust gases on the baffle plate 30 that overcomes the biasing effect provided by the flapper mount assembly 24. The valve flapper 22 may be oriented at any position between the normally-closed position and the opened position depending on the pressure exerted on the valve flapper 22 from the exhaust gases.

The flapper mount assembly mounts the valve flapper 22 to the pipe 20 for pivotable movement about the flapper pivot axis 28 from the normally-closed position to the opened position. The flapper mount assembly 24 includes a bearing system 36, a valve shaft 38 supported by the bearing system 36, and a resilient member that provides the biasing effect on the valve flapper 22. The bearing system 36 includes a thrust bushing 42 and a barrel bushing 44 mounted on opposite sides of the pipe 20 from one another relative to the valve flapper 22. The valve shaft 38 is coupled to the valve flapper 22 for rotation about the flapper pivot axis 28 with the valve flapper 22. The valve shaft 38 is supported axially and radially by the thrust bushing 42 and radially by the barrel bushing 44 to allow rotation of the valve flapper 22 about the flapper pivot axis 28. The resilient member in the illustrative embodiment, is a spring 40 however, other types of deformable or elastic members may also be used to apply the biasing effect on the valve flapper 22.

The spring 40 is configured to apply several forces on the valve shaft that position the valve flapper 22 and the valve shaft 38 relative to the pipe 20 as shown in FIG. 2. The spring 40 provides a torsional force about the flapper pivot axis 28 on the valve shaft 38 to bias the valve flapper 22 toward the normally-closed position. The spring 40 also provides a spring force on the valve shaft 38 to bias the valve shaft 38 axially along the flapper pivot axis 28 into engagement with the thrust bushing 42. The spring force is asymmetrical in the axial direction such that the valve shaft is also biased laterally about a lateral axis 46 at the thrust bushing 42. In this way, the valve shaft 38 is biased laterally by the spring 40 into engagement with a downstream side of the barrel bushing 44 so that shaft-to-bearing rattle (also known as chatter) is reduced.

The valve shaft 38 is located partially in the passageway 18 and includes a shaft body 48 and a shaft retainer 50 as shown in FIG. 2. The shaft body 48 extends between a first end 52 and a second end 54. The first end 52 is spaced apart from the thrust bushing 42 outside of the passageway 18. The second end 54 is coupled to the barrel bushing 44. The shaft retainer 50 is coupled to the shaft body 48 between the first end 52 and the second end 54 and has an outer diameter that is greater than a diameter of the shaft body 48.

The first end 52 of the valve shaft 38 is biased away from the pipe 20 to force the shaft retainer 50 into engagement with the thrust bushing 42. The shaft retainer 50 and the thrust bushing 42 cooperate the seal an opening through which the shaft body 48 extends out of the passageway 18. The second end 54 of the valve shaft 38 is allowed to float axially along the flapper pivot axis 28 relative to the barrel bushing 44. An outer diameter of the second end 54 is less than an inner diameter of the barrel bushing 44 so as not to over-constrain the valve shaft 38 from pivoting about the flapper pivot axis 28.

The size difference between the second end 54 of the shaft body 48 and the barrel bushing 44 could allow the valve shaft 38 to shift relative to the barrel bushing 44 and cause shaft-to-bearing rattle noises. The lateral force provided by the spring 40 is configured to mitigate this by retaining the second end 54 against a downstream side 56 of the barrel bushing 44 as shown in FIG. 2. The spring 40 includes a first end 58, a second end 60, and a plurality of coils 62 between the first end 58 and the second end 60. The plurality of coils 62 are shaped to provide the spring force with an asymmetrical axial load generally along the flapper axis 28 on the valve shaft 38.

The asymmetrical load includes a first axial force 64 imparted by an upstream side 65 of the spring 40 and a second axial force 66 imparted by a downstream side 67 of the spring 40. The second axial force 66 is greater than the first axial force 64 due to the shape of the spring 40. The difference between the first axial force 64 and the second axial force 66 causes an upstream lateral force 68 near the first end 52 of the shaft body 48 and a moment 70 at the thrust bushing 42 about the lateral pivot axis 46. These forces cause a downstream lateral force 72 at the second end 54 of the shaft body 48 to bias the second end 54 into the downstream side 56 of the barrel bushing 44.

The plurality of coils 62 of the bias spring 40 are closed along the upstream side of the spring 40 and opened along the downstream side of the spring as shown in FIGS. 2 and 3. The plurality of coils 62 include a top spring coil 74, a bottom spring coil 76, and a plurality of body coils 78 between the top-spring coil 74 and the bottom-spring coil 76. Each of the plurality of body spring coils 78 is arranged a first distance relative to one another along an upstream side of the bias spring 40. Each of the plurality of body spring coils 78 is arranged a second distance from one another along a downstream side of the bias spring. The second distance is greater than the first distance to provide the greater second axial force 66.

In the illustrative embodiment, adaptive valve assembly 16 further includes a spring retainer 80 including an outer spring housing 82 and an inner spring housing 84 as shown in FIGS. 2 and 4. The outer spring housing 82 is coupled to the first end 52 of the valve shaft 38 in a fixed position for rotation with the valve shaft 38. The inner spring housing 84 is coupled in a fixed position relative to the valve shaft 38 and the outer spring housing 82. The outer spring housing 82 and the valve shaft 38 rotate relative to the inner spring housing 84 as the valve flapper 22 moves between the normally-closed position to the opened position. The axial forces 64, 66 are applied between the outer spring housing 82 and the inner spring housing 84 to provide the biasing effects described above.

Figure 5:
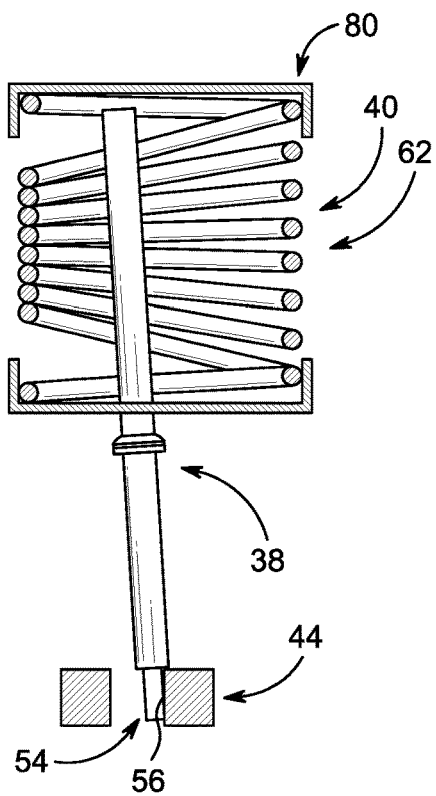
FIG. 5 is a cross section of a portion of the adaptive valve assembly of FIGS. 1, 2, and 4 with the location of the valve shaft relative to the rest of the adaptive valve assembly exaggerated to show that a distal end of the valve shaft is biased into engagement with the downstream side of the barrel bushing.

Each of the plurality of coils 62 of the bias spring 40 are generally concentric about the flapper pivot axis 28 as shown in FIGS. 2 and 4. The first end 58 of the bias spring 40 extends away from the plurality of coils 62 and into a first projection-receiving space 86 formed in the outer spring housing 82. The second end 60 of the bias spring 40 extends away from the plurality of coils 62 and into a second projection-receiving space 88 formed in the inner spring housing 84. The first end 58 is spaced 180 degrees from the second end 60 around a circumference of each of the coils 62. This arrangement orients the spring 40 properly to bias the second end 54 of the valve shaft 38 into the downstream side 56 of the barrel bushing 44. As such, the first end 58 and the second end 60 are interchangeable to provide a poka-yoke (i.e. for error-proof assembly with spring retainer 80) with the outer spring housing 82 and the inner spring housing 84 so that the valve shaft 38 is always biased into engagement with the downstream side of the barrel bushing 44. This biasing effect provided by the spring 40 on the valve shaft 38 is shown and exaggerated in FIG. 5.

Another embodiment of a spring 240 that provides the biasing effect on the valve shaft 38 is shown in FIG. 6. The spring 240 includes a plurality of coils 262 that are configured to apply an asymmetrical load on the valve shaft 38 to bias the second end 54 into engagement with the downstream side 56 of the barrel bushing 44. The plurality of coils 262 have a downstream contour 265 that is substantially parallel with the valve shaft 38 and an upstream contour 267 that is curved. The coils 262 are spaced apart from a spring axis 269 by a first distance along the downstream side of the bias spring 240. The coils 262 are spaced apart from the spring axis 269 by a second distance that changes along an axial length of the bias spring 240 relative to the spring axis 269. The difference contours of the spring 240 provide the first axial force 64 and the second axial force 66 previously described.

Another embodiment of a spring 340 that provides the biasing effect on the valve shaft 38 is shown in FIG. 7. The spring 340 includes a plurality of coils 362 that are configured to apply an asymmetrical load on the valve shaft 38 to bias the second end 54 into engagement with the downstream side 56 of the barrel bushing 44. Each of the plurality of coils 362 are offset from one another as the spring 340 extends axially to provide a lateral force on the valve shaft 38. The lateral force on the valve shaft 38 causes the moment 70 and the downstream lateral force 72 at the second end 54 of the valve shaft previously described.

It is contemplated that the flapper mount assembly 24 may be used in other types of valves in other types of application. The ability to reduce rattle in a valve via a purpose-designed spring, resilient member, or bias member like the springs 40, 240, 340 may be desired and implemented in different valves in accordance with the teaching of the present disclosure. Such valves may be passively controlled as in the illustrative example or actively actuated as the case may be.

The following numbered clauses include embodiments that are contemplated and non-limiting:

Clause 1. An adaptive valve assembly comprising
a pipe defining a passageway,
a valve flapper arranged in the passageway and configured to pivot about a flapper pivot axis from a normally-closed position to an opened position, and
a flapper mount assembly configured to couple the valve flapper to the pipe for movement about the flapper pivot axis from the normally-closed position to the opened position, the flapper mount assembly including a bushing system having a thrust bushing and a barrel bushing opposite the thrust bushing relative to the valve flapper, a valve shaft coupled to the valve flapper and supported axially and radially by the thrust bushing and radially by the barrel bushing to allow rotation of the valve flapper about the flapper pivot axis, and a resilient member configured (i) to apply a torsional force about the flapper pivot axis on the valve shaft to bias the valve flapper toward the normally-closed position and (ii) to apply a force on the valve shaft to bias the valve shaft generally along the flapper pivot axis into engagement with the thrust bushing and laterally about a lateral axis at the thrust bushing into engagement with a downstream side of the barrel bushing so that shaft-to-bearing chatter is reduced.

Clause 2. The adaptive valve assembly of clause 1 or any other suitable clause, wherein the resilient member is a bias spring that includes a first end, a second end, and a plurality of coils between the first end and the second end, wherein the plurality of coils are shaped to provide a spring force with an asymmetrical axial load generally along the flapper axis on the valve shaft.

Clause 3. The adaptive valve assembly of clause 2 or any other suitable clause, wherein the asymmetrical load includes a first axial force imparted by the upstream side of the bias spring and a second axial force imparted by the downstream side of the bias spring, the second axial force being greater than the first axial force.

Clause 4. The adaptive valve assembly of clause 3 or any other suitable clause, the plurality of coils are closed along an upstream side of the bias spring and opened along a downstream side of the bias spring.

Clause 5. The adaptive valve assembly of clause 3 or any other suitable clause, wherein the plurality of coils of the bias spring includes a top spring coil, a bottom spring coil, and a plurality of body coils between the top-spring coil and the bottom-spring coil and each of the plurality of body spring coils is arranged a first distance relative to one another along an upstream side of the bias spring and is arranged a second distance from one another along a downstream side of the bias spring, the second distance being greater than the first distance.

Clause 6. The adaptive valve assembly of clause 4 or any other suitable clause, further comprising a spring retainer including an outer spring housing coupled to the valve shaft in a fixed position for rotation with the valve shaft and an inner spring housing coupled in a fixed position relative to the valve shaft and the outer spring housing.

Clause 7. The adaptive valve assembly of clause 6 or any other suitable clause, wherein the first end of the bias spring extends away from the plurality of coils and into a first projection-receiving space formed in the outer spring housing and the second end of the bias spring extends away from the plurality of coils and into a second projection-receiving space formed in the inner spring housing that is spaced 180 degrees from the first projection-receiving space around a circumference of each of the coils to orient the spring relative to the valve shaft.

Clause 8. The adaptive valve assembly of clause 7 or any other suitable clause, wherein each of the plurality of coils are concentric and the first end and the second end are interchangeable to provide a poka-yoke with the outer spring housing and the inner spring housing so that the valve shaft is always biased into engagement with the downstream side of the barrel bushing.

Clause 9. The adaptive valve assembly of clause 1 or any other suitable clause, wherein the bias spring includes a plurality of coils that extend circumferentially about a spring axis and the coils are spaced apart from the spring axis by a first distance along a downstream side of the bias spring and the coils are spaced apart from the spring axis by a second distance that changes along an axial length of the bias spring relative to the spring axis.

Clause 10. The adaptive valve assembly of clause 1 or any other suitable clause, wherein the bias spring includes a top-planar coil, a bottom planar coil spaced apart from the top planar coil and a plurality of open coils between the top planar coil and the bottom planar coil and the top planar coil is offset from the bottom planar coil to provide a lateral force against the valve shaft.

Clause 11. An internal combustion engine system comprising
an internal combustion engine configured to produce exhaust gases as a product of a combustion reaction,
an exhaust discharge pipe coupled to the internal combustion engine and defining a passageway that is configured to direct the exhaust gases from the internal combustion engine to atmosphere, and
an adaptive valve assembly coupled to the exhaust discharge pipe and configured to receive the exhaust gases prior to the exhaust gases reaching the atmosphere, the adaptive valve assembly comprising
a valve flapper arranged in the passageway and configured to pivot about a flapper pivot axis from a normally-closed position to an opened position and
a flapper mount assembly configured to couple the valve flapper to the pipe for movement about the flapper pivot axis from the normally-closed position to the opened position, the flapper mount assembly including a bushing system having a thrust bushing and a barrel bushing opposite the thrust bushing relative to the valve flapper, a valve shaft coupled to the valve flapper and supported axially and radially by the thrust bushing and radially by the barrel bushing to allow rotation of the valve flapper about the flapper pivot axis, and a resilient member configured (i) to apply a torsional force about the flapper pivot axis on the valve shaft to bias the valve flapper toward the normally-closed position and (ii) to apply a force on the valve shaft to bias the valve shaft generally along the flapper pivot axis into engagement with the thrust bushing and laterally about a lateral axis at the thrust bushing into engagement with a downstream side of the barrel bushing so that shaft-to-bearing chatter is reduced.

Clause 12. The internal combustion engine system of clause 11 or any other suitable clause, wherein the resilient member is a bias spring that includes a first end, a second end, and a plurality of coils between the first end and the second end, wherein the plurality of coils are shaped to provide a spring force with an asymmetrical axial load generally along the flapper axis on the valve shaft.

Clause 13. The internal combustion engine system of clause 12 or any other suitable clause, wherein the asymmetrical load includes a first axial force imparted by the upstream side of the bias spring and a second axial force imparted by the downstream side of the bias spring, the second axial force being less than the first axial force.

Clause 14. The internal combustion engine system of clause 13 or any other suitable clause, the plurality of coils are closed along an upstream side of the bias spring and opened along a downstream side of the bias spring.

Clause 15. The internal combustion engine system of clause 13 or any other suitable clause, wherein the plurality of coils of the bias spring includes a top spring coil, a bottom spring coil, and a plurality of body coils between the top-spring coil and the bottom-spring coil and each of the plurality of body spring coils is arranged a first distance relative to one another along an upstream side of the bias spring and is arranges a second distance from one another along a downstream side of the bias spring.

The invention claimed is:

1. An adaptive valve assembly comprising
a pipe defining a passageway,
a valve flapper arranged in the passageway and configured to pivot about a flapper pivot axis from a normally-closed position to an opened position, and
a flapper mount assembly configured to couple the valve flapper to the pipe for movement about the flapper pivot axis from the normally-closed position to the opened position, the flapper mount assembly including a bushing system having a thrust bushing and a barrel bushing opposite the thrust bushing relative to the valve flapper, a valve shaft coupled to the valve flapper and supported axially and radially by the thrust bushing and radially by the barrel bushing to allow rotation of the valve flapper about the flapper pivot axis, and a resilient member configured (i) to apply a torsional force about the flapper pivot axis on the valve shaft to bias the valve flapper toward the normally-closed position and (ii) to apply a force on the valve shaft to bias the valve shaft generally along the flapper pivot axis into engagement with the thrust bushing and laterally about a lateral axis at the thrust bushing into engagement with a downstream side of the barrel bushing so that shaft-to-bearing chatter is reduced.

2. The adaptive valve assembly of claim 1, wherein the resilient member is a bias spring that includes a first end, a second end, and a plurality of coils between the first end and the second end, wherein the plurality of coils are shaped to provide a spring force with an asymmetrical axial load generally along the flapper axis on the valve shaft.

3. The adaptive valve assembly of claim 2, wherein the asymmetrical load includes a first axial force imparted by the upstream side of the bias spring and a second axial force imparted by the downstream side of the bias spring, the second axial force being greater than the first axial force.

4. The adaptive valve assembly of claim 3, the plurality of coils are closed along an upstream side of the bias spring and opened along a downstream side of the bias spring.

5. The adaptive valve assembly of claim 3, wherein the plurality of coils of the bias spring includes a top spring coil, a bottom spring coil, and a plurality of body coils between the top-spring coil and the bottom-spring coil and each of the plurality of body spring coils is arranged a first distance relative to one another along an upstream side of the bias spring and is arranged a second distance from one another along a downstream side of the bias spring, the second distance being greater than the first distance.

6. The adaptive valve assembly of claim 4, further comprising a spring retainer including an outer spring housing coupled to the valve shaft in a fixed position for rotation with the valve shaft and an inner spring housing coupled in a fixed position relative to the valve shaft and the outer spring housing.

7. The adaptive valve assembly of claim 6, wherein the first end of the bias spring extends away from the plurality of coils and into a first projection-receiving space formed in the outer spring housing and the second end of the bias spring extends away from the plurality of coils and into a second projection-receiving space formed in the inner spring housing that is spaced 180 degrees from the first projection-receiving space around a circumference of each of the coils to orient the spring relative to the valve shaft.

8. The adaptive valve assembly of claim 6, wherein each of the plurality of coils are concentric and the first end and the second end are interchangeable to provide a poka-yoke with the outer spring housing and the inner spring housing so that the valve shaft is always biased into engagement with the downstream side of the barrel bushing.

9. The adaptive valve assembly of claim 1, wherein the bias spring includes a plurality of coils that extend circumferentially about a spring axis and the coils are spaced apart from the spring axis by a first distance along a downstream side of the bias spring and the coils are spaced apart from the spring axis by a second distance that changes along an axial length of the bias spring relative to the spring axis.

10. The adaptive valve assembly of claim 1, wherein the bias spring includes a top-planar coil, a bottom planar coil spaced apart from the top planar coil and a plurality of open coils between the top planar coil and the bottom planar coil and the top planar coil is offset from the bottom planar coil to provide a lateral force against the valve shaft.

11. An internal combustion engine system comprising
an internal combustion engine configured to produce exhaust gases as a product of a combustion reaction,
an exhaust discharge pipe coupled to the internal combustion engine and defining a passageway that is configured to direct the exhaust gases from the internal combustion engine to atmosphere, and
an adaptive valve assembly coupled to the exhaust discharge pipe and configured to receive the exhaust gases prior to the exhaust gases reaching the atmosphere, the adaptive valve assembly comprising
a valve flapper arranged in the passageway and configured to pivot about a flapper pivot axis from a normally-closed position to an opened position and
a flapper mount assembly configured to couple the valve flapper to the pipe for movement about the flapper pivot axis from the normally-closed position to the opened position, the flapper mount assembly including a bushing system having a thrust bushing and a barrel bushing opposite the thrust bushing relative to the valve flapper, a valve shaft coupled to the valve flapper and supported axially and radially by the thrust bushing and radially by the barrel bushing to allow rotation of the valve flapper about the flapper pivot axis, and a resilient member configured (i) to apply a torsional force about the flapper pivot axis on the valve shaft to bias the valve flapper toward the normally-closed position and (ii) to apply a force on the valve shaft to bias the valve shaft generally along the flapper pivot axis into engagement with the thrust bushing and laterally about a lateral axis at the thrust bushing into engagement with a downstream side of the barrel bushing so that shaft-to-bearing chatter is reduced.

12. The internal combustion engine system of claim 11, wherein the resilient member is a bias spring that includes a first end, a second end, and a plurality of coils between the first end and the second end, wherein the plurality of coils are shaped to provide a spring force with an asymmetrical axial load generally along the flapper axis on the valve shaft.

13. The internal combustion engine system of claim 12, wherein the asymmetrical load includes a first axial force imparted by the upstream side of the bias spring and a second axial force imparted by the downstream side of the bias spring, the second axial force being less than the first axial force.

14. The internal combustion engine system of claim 13, the plurality of coils are closed along an upstream side of the bias spring and opened along a downstream side of the bias spring.

15. The internal combustion engine system of claim 13, wherein the plurality of coils of the bias spring includes a top spring coil, a bottom spring coil, and a plurality of body coils between the top-spring coil and the bottom-spring coil and each of the plurality of body spring coils is arranged a first distance relative to one another along an upstream side of the bias spring and is arranges a second distance from one another along a downstream side of the bias spring.

\* \* \* \* \*